B. L. GATES.
BABY CART.
APPLICATION FILED SEPT. 21, 1912. RENEWED JUNE 28, 1915.
1,190,398.
Patented July 11, 1916.
2 SHEETS—SHEET 1.
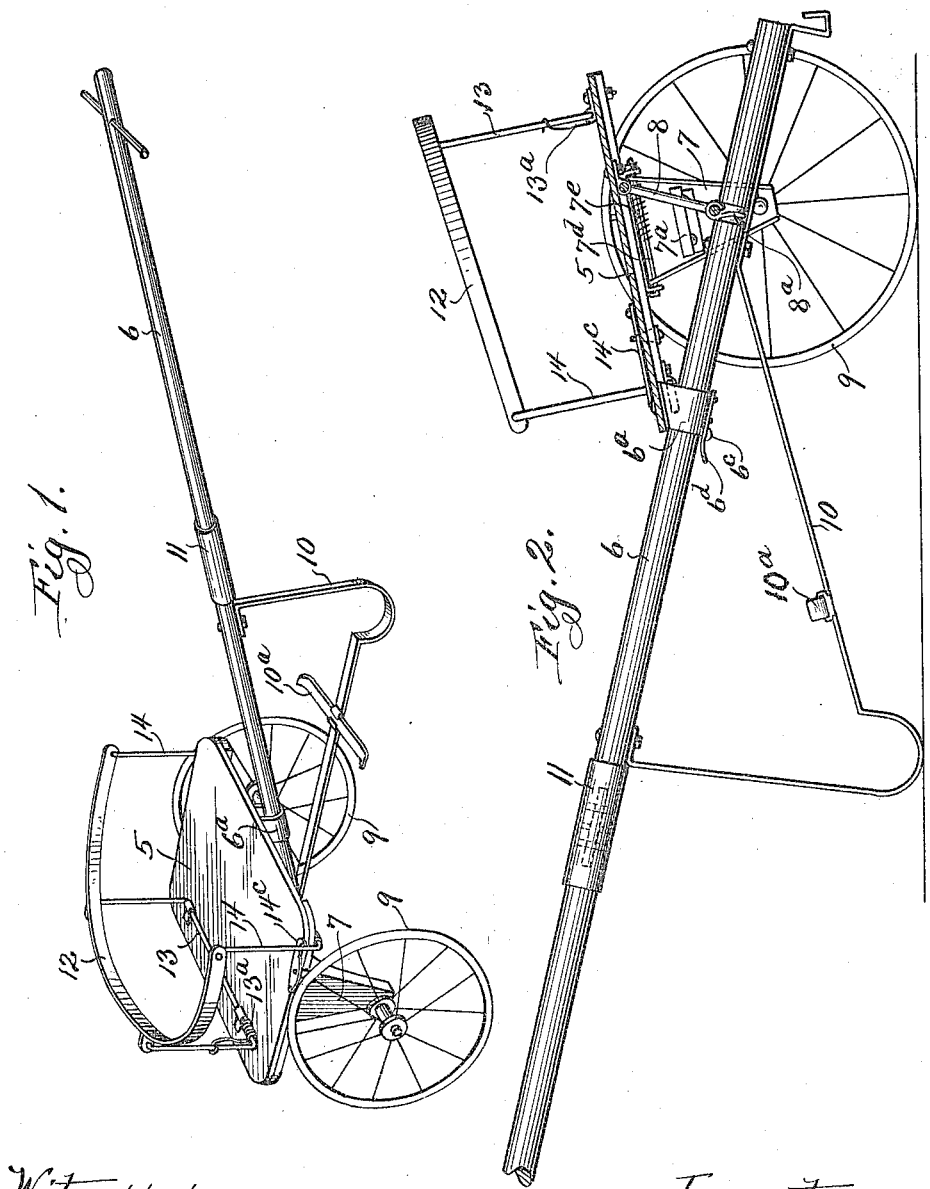
Witnesses:
R. J. Jacker
A. C. Helms
Inventor:
Benj. Lowell Gates
By Jno. H. Whipple
Atty.

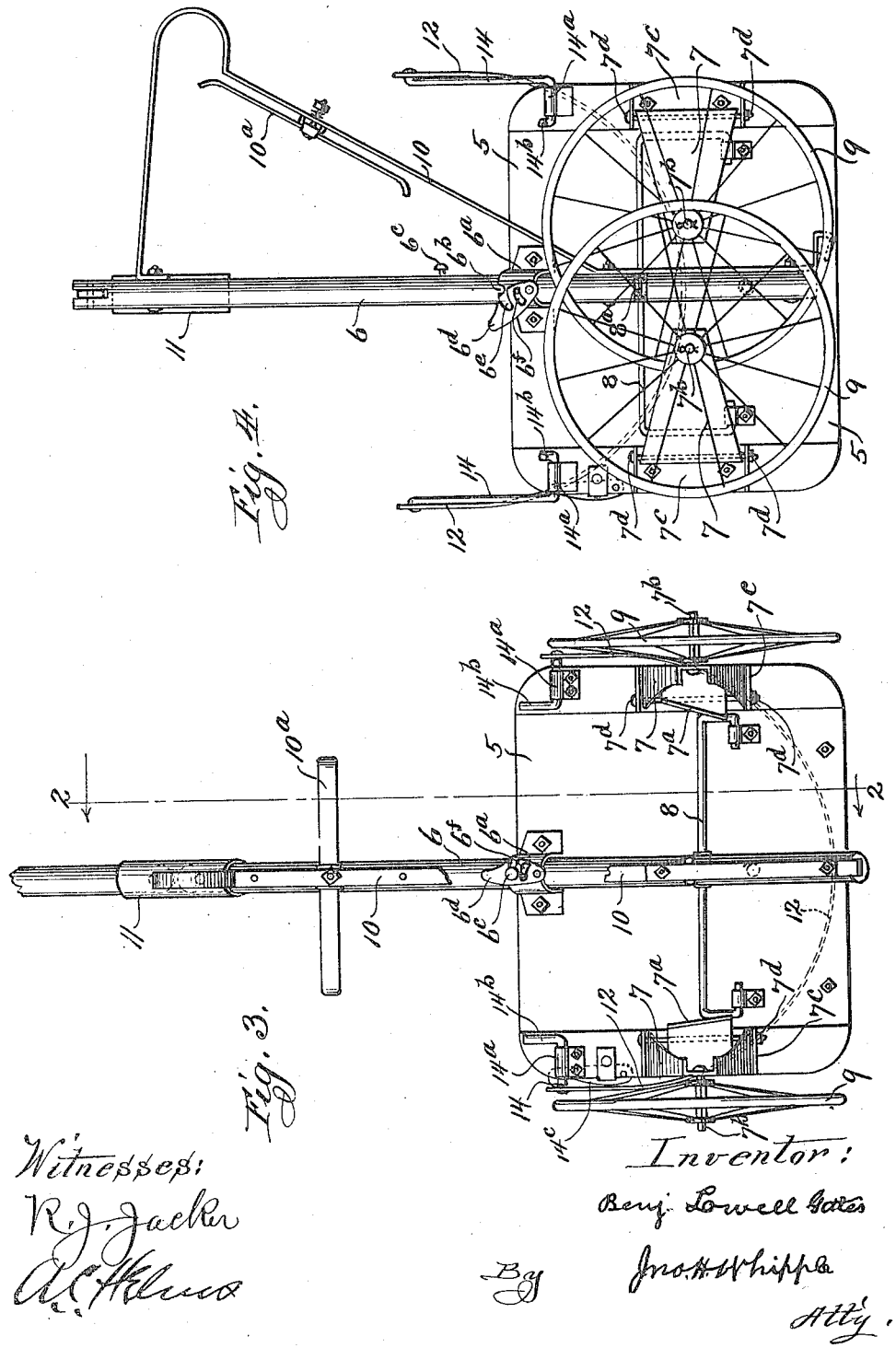

UNITED STATES PATENT OFFICE.

BENJIMAN LOWELL GATES, OF CHICAGO, ILLINOIS, ASSIGNOR TO RHINEHARDT H. BROWN, OF CHICAGO, ILLINOIS.

BABY-CART.

1,190,398.   Specification of Letters Patent.   Patented July 11, 1916.

Application filed September 21, 1912, Serial No. 721,552.   Renewed June 28, 1915.   Serial No. 36,905.

*To all whom it may concern:*

Be it known that I, BENJIMAN L. GATES, a citizen of the United States, residing at Chicago, in the county of Cook and State of Illinois, have invented a new and useful Baby-Cart, of which the following is a specification.

My invention is concerned with improvements in children's collapsible vehicles, and more especially with two-wheeled vehicles, and is designed primarily to produce such a vehicle that, after being unlocked, the wheel frames may be erected simply by resting it on the ground and pressing downward on the tongue, which, in this position, will be substantially vertical.

It is further concerned with such a vehicle in which, to facilitate collapsing it, springs are interposed between the main frame and the wheel frames, so that when the erecting frame is moved out of engagement with the wheel frames, the springs will operate to collapse said wheel frames automatically.

It is further concerned with certain novel combinations and constructions of elements in such a vehicle, as will be fully described hereinafter and particularly pointed out in the claims.

To illustrate my invention, I annex hereto two sheets of drawings, in which the same reference characters are used to designate identical parts in all the figures, of which,—

Figure 1 is a front perspective view of a baby-cart made to embody my invention, the parts being extended as in position for use; Fig. 2 is a vertical section on the line 2—2 of Fig. 3. Fig. 3 is a bottom plan view of the cart as seen when inverted and looked down upon, the wheels being unfolded. Fig. 4 is a bottom view of the cart as seen when folded.

Similar signs refer to similar parts throughout the several views.

The numeral 5 designates the seat or main frame, 6 the handle or pole, 7 hinged brackets or wheel frames, and 8 a cam yoke or erecting frame pivoted to the under side of the seat and having swivel connection $8^a$ with the pole. The brackets 7 are provided with projecting parts having inclined surfaces $7^a$ upon which the yoke has bearing for unfolding said brackets.

The means for connection of the pole to the seat is best shown in Figs. 3 and 4 and consists preferably of a clip $6^a$ bolted to the seat and adapted to hold the pole against the seat at the front edge of the seat while farther back it permits the pole to take an oblique position as seen in Fig. 2. The clip is provided with a slot or notch $6^b$ into which a projecting screw $6^c$ on the pole falls when the pole is turned a quarter around from its position in Fig. 4 and shoved along in the clip. A latch $6^d$ is pivoted to the clip and provided with an open ended slot $6^e$ which may be turned into engagement with the screw $6^c$ for holding the pole locked from further sliding in the clip. The latch also has a slot $6^f$ adapted to work in connection with a stop-pin for limiting the motion of the latch.

The cart wheels 9 are mounted on spindles $7^b$ of the brackets. The mode of hinging the brackets is by short sections of channel iron $7^c$ bolted to the seat, the base of the bracket fitting in the channel and being secured by a rod or bolt $7^d$ passed through holes near the inner part of the channel and brackets so as to leave the bracket free to be turned up from the seat to a perpendicular therewith and be stopped from going any farther, with the spindle projecting outwardly in position to receive the wheel.

The hinge bolt is preferably provided with a coil spring $7^e$ (Fig. 2) tending to turn the brackets inwardly toward the underside of the seat so that when the latch $6^d$, as seen in Fig. 3, is thrown back, as seen in Fig. 4, the wheels will fold to the position shown in Fig. 4, automatically. To do this one of the wheels must move ahead of the other. To get a quicker movement of the wheel at the right hand side, as viewed in Fig. 3, the inclining of the surface $7^a$ from a right angle is increased on that side.

To unfold the wheels the pole is first rotated a quarter to bring the screw $6^c$ in line with the notch $6^b$, then it is shoved along in the clip at the same time obliquing it as in Fig. 2. By this movement the yoke 8, which lies under the folded brackets, is raised through a quarter arc lifting the brackets until its opposite ends are caused to pass between the inclined surfaces 7ª and spread them apart sufficient to turn the brackets and wheels into working position as seen in Fig. 3. The action of the latch 6ᵈ locking the pole in place serves also to lock the wheel frames 7 in their erected position.

A brace 10 is mounted on the under side of the pole and carries a folding foot rest 10ª, which is provided with keepers and attached by a spring bolt adapted to keep it in working position and permit of its being folded. This brace strikes the ground in front or at the rear when the cart is at rest and prevents its tipping either forward or backward too far. When the brace is folded into parallel relation with the seat it may serve as a bail to carry the cart by.

The pole may be made to fold by means of a hinge connecting separate parts and covered by a sliding sleeve 11. The part of the pole 6 below the hinge constitutes a member sliding on the main frame to erect the wheel frames, while the part above the hinge constitutes the handle or tongue of the sulky.

The seat is provided with a folding railing or back rest or back-supporting frame 12 which is pivoted to the top of a U-shaped rod 13 pivoted at the bottom of the U to the seat at the base and provided with a spring 13ª normally tending to fold the rod and railing down upon the seat. At the front said railing is connected with two rods 14 which pass down at the edges of the seat and turn under the same and run through eye-pieces 14ª which are bolted to the bottom of the seat, a part 14ᵇ projecting through the eye, being adapted to stand out from the under side of the seat when the railing is folded down upon the seat and to turn up against the under side of the seat to operate as a stop to the turning of the rods 14 beyond the perpendicular with the seat when unfolding the railing. A spring-pressed catch or locking mechanism 14ᶜ is adapted to engage one of the rods 14 for holding the railing extended as seen in Figs. 1 and 2. When the catch is sprung out of engagement the counter spring 13ª operates to fold the railing down upon the seat with a part and the rods 14 projecting to the front of the seat as seen in Fig. 4. The seat and pole are preferably made of wood, the wheels are articles of commerce, all the other parts are of sheet metal or small metal rods and may be stamped and bent into the required form or shape to cheapen the manufacture of the cart.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a two-wheeled baby-cart, the combination with a seat, of a pair of wheel brackets pivoted to the under side of the seat at opposite points and provided with cam surfaces inclined to their axes of rotation, a cam-yoke pivoted to the seat between the brackets and adapted to turn up against the seat and down between the brackets, and a pole having sliding and tilting connection with the seat and swiveling connection with the cam-yoke for unfolding the brackets.

2. In a two-wheeled baby-cart, the combination with a seat, of a pair of spring-pressed wheel brackets pivoted to the seat and provided with oppositely inclined cam surfaces, a cam-yoke pivoted to the seat between the brackets and adapted to turn up against the seat and down between the brackets, and a pole having sliding and tilting connection with the seat and swiveling connection with the cam-yoke.

3. In a two-wheeled baby-cart, the combination with a seat, of a pair of wheel brackets pivoted to the seat to fold toward one another and provided with oppositely inclined cam surfaces, a cam-yoke pivoted to the seat between the brackets, a pole having sliding and tilting connection with the seat and swiveling connection with the cam-yoke for unfolding the brackets, and means for locking the parts in their unfolded condition.

4. In a two-wheeled baby-cart, the combination with a seat, of a pair of wheel brackets pivoted to the seat to fold toward one another and provided with oppositely inclined cam-surfaces, the degree of inclination varying in one of said surfaces from that of the other to effect a more rapid folding of one of said brackets over the other, a cam-yoke pivoted to the seat between said brackets and a pole having sliding and tilting connection with the seat and connection with the cam-yoke for folding and unfolding said brackets the one more rapidly than the other.

5. In a two-wheeled baby-cart, the combination with a seat, of a clip 6ª constructed with oblique flanges for bolting to the seat and provided with a recess 6ᵇ at one end, a pole adapted to slide, tilt and rotate in said clip, a projection 6ᶜ on said pole, and a pivoted latch provided with a recess 6ᵈ adapted to engage projection 6ᶜ in recess 6ᵇ.

6. In a two-wheeled baby-cart, the combination with a seat; of a pair of wheel brackets provided with spindles 7ᵇ 7ᵇ and pivoted to the seat to fold inwardly but not outwardly beyond a position perpendicular to the seat, means for folding said brackets inwardly, a pole having sliding and tilting connection with the seat, and means in connection with the pole for unfolding said brackets and locking them in unfolded condition.

7. In a two-wheeled baby-cart, the combination with a seat, of a pole having sliding and rotating connection with the seat, a brace mounted on the pole to limit the tilting of the seat too far backward or forward, and a folding foot-rest mounted on said brace.

8. In a two-wheeled baby-cart, the combination with a seat, of a pole having sliding connection with the seat and made in two sections of substantially equal length, a hinge for connecting the sections so as to permit the outer of said sections to fold toward the seat and a sleeve adapted to slide over the hinge for holding the folding section of said pole extended for use.

9. In a device of the class described, the combination with a main frame, of wheel frames secured thereto, a tongue connected with the main frame, a brace mounted on the tongue to limit the tilting of the seat, and a folding foot-rest mounted on said brace.

10. In a device of the class described, the combination with a main frame, of wheel frames pivoted thereto, an erecting frame coöperating with the wheel frames, a tongue, and connections between the tongue and erecting frame so that a longitudinal thrust on the tongue will erect the wheel frames.

11. In a device of the class described, the combination with a main frame, of wheel frames pivoted thereto, an erecting frame coöperating with the wheel frames, a member slidingly mounted on the main frame and associated with the tongue, and connections between the sliding member and erecting frame so that a longitudinal thrust on the tongue will erect the wheel frames.

12. In a device of the class described, the combination with a main frame, of wheel frames pivoted thereto, an erecting frame coöperating with the wheel frames, a tongue, connections between the tongue and erecting frame so that a longitudinal thrust on the tongue will erect the wheel frames, and springs interposed between the main frame and the wheel frames to collapse the latter when the tongue is moved back to its collapsed position.

13. In a device of the class described, the combination with a main frame, of a pair of wheel frames pivoted thereto and adapted to be moved from collapsed to erected position and vice versa, an erecting frame movable on the main frame to move the wheel frames to erected position, and springs for throwing the wheel frames from their erected position to their collapsed position when the erecting frame is moved back.

14. In a collapsible vehicle, the combination with a main frame, of a pair of wheel frames pivoted thereto and adapted to be moved from collapsed to erected position, and vice versa, locking means for holding the wheel frames locked in their erected position, and springs for throwing the wheel frames from their erected position to their collapsed position when said wheel frames are unlocked.

15. In a collapsible vehicle, the combination with a main frame, of a pair of wheel frames pivoted thereto, cams secured to the wheel frames, an erecting frame pivoted to the main frame and adapted to coöperate with the cams to move the wheel frames to their erected position or to be moved out of engagement therewith, and springs interposed between the main frame and the wheel frames, and serving to throw the latter to their collapsed position when the erecting frame is moved out of engagement with the cams.

16. In a collapsible sulky, the combination with a main frame, of a pair of wheel frames pivoted thereto, cams secured to the wheel frames, an erecting frame pivoted to the main frame and adapted to coöperate with the cams to move the wheel frames to their erected position or to be moved out of engagement therewith, a member sliding on the main frame and connected to the erecting frame to move the latter, and a handle connected to said member so that by pressing on the handle the wheel frames may be erected.

17. In a collapsible vehicle, the combination with a main frame, of a pair of wheel frames pivoted thereto, cams secured to the wheel frames, an erecting frame pivoted to the main frame and adapted to coöperate with the cams to move the wheel frames to their erected position or to be moved out of engagement therewith, and springs interposed between the main frame and the wheel frames, and serving to throw the latter to their collapsed position when the erecting frame is moved out of engagement with the cams.

18. In a collapsible sulky, the combination with a main frame, of a pair of wheel frames pivoted thereto, cams secured to the wheel frames, an erecting frame pivoted to the main frame and adapted to coöperate with the cams to move the wheel frames to their erected position or to be moved out of engagement therewith, a member sliding on the main frame and connected to the erecting frame to move the latter, and a handle connected to said member so that by pressing on the handle the wheel frames may be erected.

19. In a collapsible sulky, the combination with a main frame, of a pair of side frames pivoted thereto and adapted to be moved from erected to collapsed position, and vice versa, locking means for holding said side frames in their erected position, and springs for throwing the side frames to their collapsed position when they are unlocked.

BENJ. LOWELL GATES.

Witnesses:
A. L. BAKER,
H. H. RINGER.

Copies of this patent may be obtained for five cents each, by addressing the "Commissioner of Patents, Washington, D. C."